(12) United States Patent
Radack et al.

(10) Patent No.: US 10,664,325 B1
(45) Date of Patent: May 26, 2020

(54) SYSTEM FOR LIMITING SHARED RESOURCE ACCESS IN MULTICORE SYSTEM-ON-CHIP (SOC)

(71) Applicant: Rockwell Collins, Inc., Cedar Rapids, IA (US)

(72) Inventors: David J. Radack, Robins, IA (US); Carl J. Henning, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 76 days.

(21) Appl. No.: 16/123,819

(22) Filed: Sep. 6, 2018

(51) Int. Cl.
*G06F 9/48* (2006.01)
*G06F 9/52* (2006.01)
*G06F 9/50* (2006.01)

(52) U.S. Cl.
CPC .............. *G06F 9/52* (2013.01); *G06F 9/4881* (2013.01); *G06F 9/5027* (2013.01)

(58) Field of Classification Search
CPC ........ G06F 13/36; G06F 1/329; G06F 9/3867; G06F 11/3452; G06F 2209/501; G06F 9/50

See application file for complete search history.

(56) References Cited

U.S. PATENT DOCUMENTS

| | | | |
|---|---|---|---|
| 8,943,287 B1 | 1/2015 | Miller et al. | |
| 8,958,297 B1* | 2/2015 | Miller | H04L 47/22 370/235 |
| 9,432,298 B1* | 8/2016 | Smith | H04L 49/9057 |
| 9,965,326 B1 | 5/2018 | Miller et al. | |
| 2007/0094626 A1* | 4/2007 | Alter | G06F 17/5031 716/108 |
| 2009/0013293 A1* | 1/2009 | Buehler | G06F 17/5031 716/113 |
| 2012/0072631 A1* | 3/2012 | Chirca | G06F 13/366 710/244 |
| 2015/0339237 A1* | 11/2015 | Heddes | G06F 12/0875 711/137 |
| 2019/0205244 A1* | 7/2019 | Smith | G06F 3/0613 |
| 2019/0281587 A1* | 9/2019 | Zhang | H04L 1/00 |

* cited by examiner

*Primary Examiner* — Dong U Kim
(74) *Attorney, Agent, or Firm* — Suiter Swantz pc llo

(57) ABSTRACT

A multicore processing environment (MCPE) implements a shared resource access rate (SRAR) safety net to limit the access of user applications to shared system resources (SSR). For each user application, a baseline shared resource access time (SRAT) and baseline SSR access rate (while no other competing applications interfere) may be determined. A utilization for each accessed SSR, including worst case execution time and contention SRAT for competing applications, may be determined. For the user application and competing applications, an access time delta for each accessed SSR and total delta may be determined. Based on the total delta and an access count for each SSR, a multicore derating for the user application may be determined and the time requirement adjusted or allocated to include the multicore derating and baseline SRAT. Accordingly, the core rate limiters may limit data access to each SSR by the user application to a corresponding expected value.

20 Claims, 8 Drawing Sheets

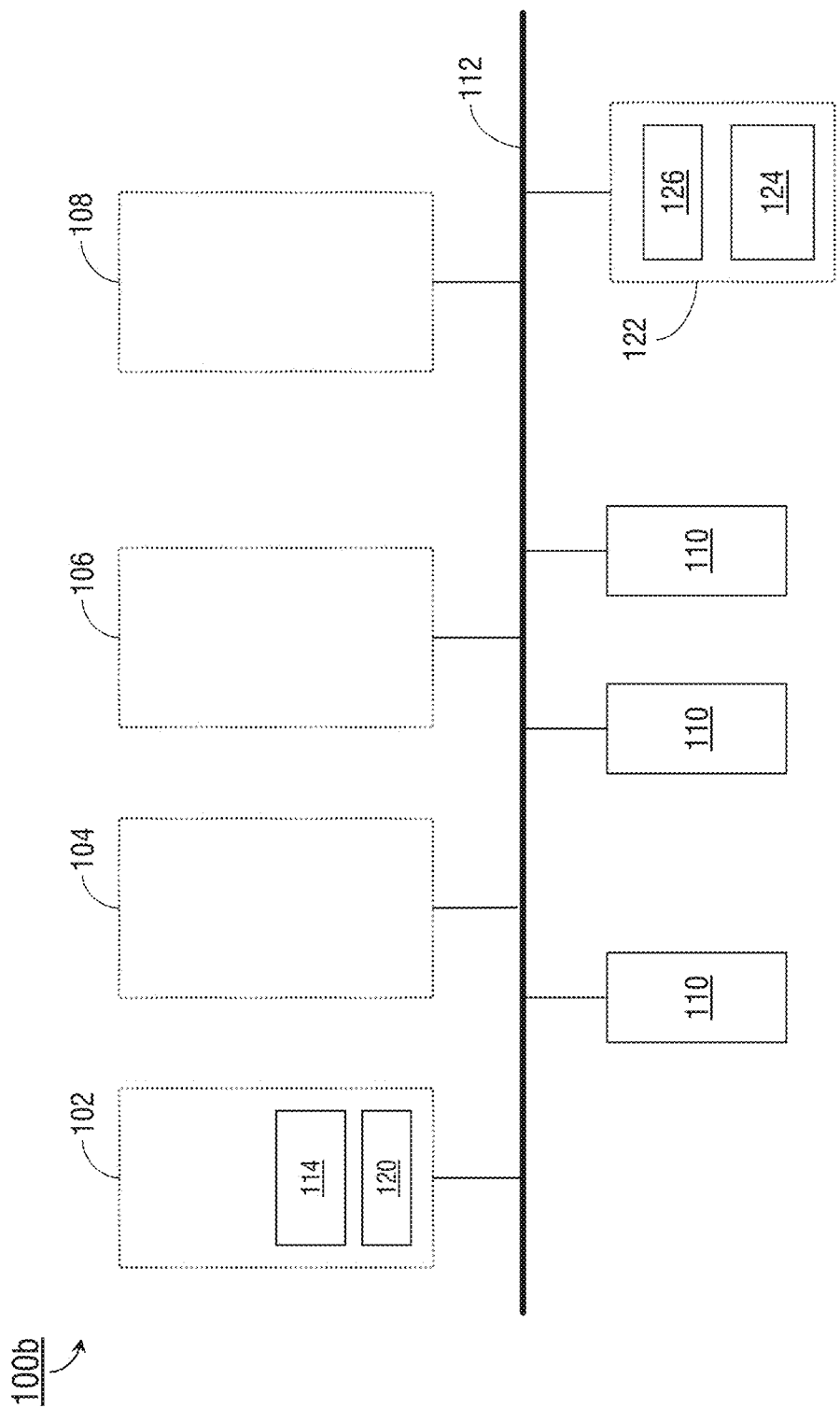

SYSTEM FOR LIMITING SHARED RESOURCE ACCESS IN MULTICORE SYSTEM-ON-CHIP (SOC)

BACKGROUND

A multicore processor (or multicore processing environment (MCPE)) provides two or more processing cores (processing units) capable of executing multiple tasks or processes at once. Certification of such safety-critical multicore-based avionics processing systems is an important goal for the aviation industry (although multicore processing systems may similarly be implemented across water-based or ground-based mobile platforms). If multiple cores, or multiple applications configured to execute concurrently on said cores, compete for the same shared resources, a particular core or application may access or use a particular shared resource to an excessive degree, which may in turn interfere with and degrade the use of said shared resource by other applications or cores within the MCPE, creating latency issues for said other applications.

SUMMARY

In one aspect, embodiments of the inventive concepts disclosed herein are directed to a multicore processing environment (MCPE) configured to implement a shared resource access rate (SRAR) safety net to limit the access of user applications running in the MCPE to shared system resources above and beyond DDR memory (e.g., caches, controllers, peripheral devices). The MCPE comprises a group of processing cores, each core hosting one or more user applications and including a core rate limiter. Similarly, the MCPE includes various shared system resources (SSR; e.g., memory units, caches, controllers); each SSR may be accessed by one or more user applications, sometimes concurrently, via a common access bus interconnecting the processing cores and SSRs. For each user application configured to execute on a particular core of the MCPE, and for each SSR accessed by the user application, the MCPE (e.g., via an integrator) may determine a baseline shared resource access time (SRAT) of the SSR by the user application based on the capacity of the common access bus to handle access requests to the SSR. Based on this baseline SRAT, the MCPE determines a baseline SSR access rate of the SSR by the user application while the other user applications running on the MCPE are not accessing the SSR. The MCPE determines a utilization of the SSR, which may include a worst-case scenario corresponding to maximum utilization of the SSR and a contention SRAT of other concurrent applications competing with the user application under test for access to the SSR. Based on the worst-case scenario or the contention SRAT, the MCPE determines an access time delta (e.g., over the baseline SRAT) based on the user application under test and the corresponding competing applications. For each SSR accessed by the user application under test, the MCPE determines a total delta based on the determined access time delta for the user application and corresponding competing applications. Based on the determined total delta for each SSR accessed by the user application under test, as well as a count of accesses of the SSR by the user application, the MCPE determines a multicore derating of the user application under test; the multicore derating, when combined with the baseline SRAT, should provide sufficient execution time for the user application to overcome multicore interference with its access to the SSR to a predetermined goal (e.g., probability of availability).

Based on the determined multicore derating, the computation time requirement of the user application may be adjusted to include the multicore derating and baseline SRAT (note that the adjusted computation time requirement may be less than that associated with a worst-case scenario where the SSR is maximally utilized and the user application always completes its assigned tasks). The core rate limiters of the processing cores where the user applications are hosted may constrain the data access rates of the user applications such that each user application's access to its associated SSRs may be limited to an expected value based on the adjusted time requirement.

In a further aspect, embodiments of the inventive concepts disclosed herein are directed to a multicore processing environment (MCPE) configured to implement a shared resource access rate (SRAR) safety net to limit the access of user applications running in the MCPE to shared system resources above and beyond DDR memory (e.g., caches, controllers, peripheral devices). The MCPE comprises a group of processing cores, each core hosting one or more user applications and including a core rate limiter. Similarly, the MCPE includes various shared system resources (SSR; e.g., memory units, caches, controllers); each SSR may be accessed by one or more user applications, sometimes concurrently, via a common access bus interconnecting the processing cores and SSRs. For each user application configured to execute on a particular core of the MCPE, and for each SSR accessed by the user application, the MCPE (e.g., via an integrator) may determine a shared resource access time (SRAT) of the SSR by the user application based on the capacity of the common access bus to handle access requests to the SSR. Based on this baseline SRAT, the MCPE determines a baseline SSR access rate of the SSR by the user application while the other applications running on the MCPE are not accessing the SSR. The MCPE determines a utilization of the SSR, which may include a worst-case scenario corresponding to maximum utilization of the SSR and a contention SRAT of other concurrent applications competing with the user application under test for access to the SSR. Based on the worst-case scenario or the contention SRAT, the MCPE determines an access time delta (e.g., over the baseline SRAT) based on the user application under test and the corresponding competing applications. For each SSR accessed by the user application under test, the MCPE determines a total delta based on the determined access time delta for the user application and corresponding competing applications. Based on the determined total delta for each SSR accessed by the user application under test, as well as a count of accesses of the SSR by the user application, the MCPE determines a multicore derating of the user application under test; the multicore derating, when combined with the baseline SRAT, should provide sufficient execution time for the user application to overcome multicore interference with its access to the SSR to a predetermined goal. Based on the determined multicore derating, the MCPE may allocate a computation time requirement to the user application based on the multicore derating and baseline SRAT (note that the allocated computation time requirement may be less than that associated with a worst-case scenario where the SSR is maximally utilized and the user application always completes its assigned tasks). The core rate limiters of the processing cores where the user applications are hosted may constrain the data access rates of the user applications such that each user application's access to its associated SSRs may be limited to an expected value based on the allocated time requirement.

In a still further aspect, embodiments of the inventive concepts disclosed herein are directed to a method for limiting shared resource access by user applications executing in an MCPE. The method includes, for each user application executing on a processing core of the MCPE, the core including a core rate limiter, determining a shared resource access time (SRAT) of at least one shared system resource (SSR) of the MCPE accessed by the user application relative to a capacity of a common access bus for access requests to the SSR. The method includes determining a baseline SRAT of the SSR by the user application, based on a baseline SSR access rate of the SSR by the user application while the SSR is not accessed by the other applications running in the MCPE. The method includes determining a utilization of the SSR based on at least one set of competing applications configured to concurrently access the SSR, the utilization may include a worst case scenario (e.g., a worst case execution time (WCET)) corresponding to maximum utilization of the SSR and a contention SRAT associated with the set of concurrently competing applications. The method includes determining an access time delta (e.g., relative to the baseline SRAT) for the user application and the set of competing applications based on one or more of the contention SRAT and the worst case scenario. The method includes determining a total delta of all SSR accessed by the user application, based on the determined access time delta for each accessing first application and each concurrently accessing set of competing applications. The method includes determining a multicore derating of the user application based on the determined total delta and an access count for each accessed SSR, the multicore derating combined with the baseline SRAT providing sufficient time to overcome multicore interference associated with access to each SSR by the user application to a predetermined goal (although the multicore derating combined with the baseline SRAT may be less than the WCET). The method includes adjusting a computation time requirement of the user application to include the multicore derating and the baseline SRAT. The method includes constraining, via the core rate limiter, a data access rate of the processing core hosting each user application such that each SSR data access by the user application is capable of being limited to an expected value corresponding to the adjusted computation time requirement.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a diagrammatic illustration of the MCPE of FIG. 1; and

DETAILED DESCRIPTION OF EXEMPLARY EMBODIMENTS

Figure 1:
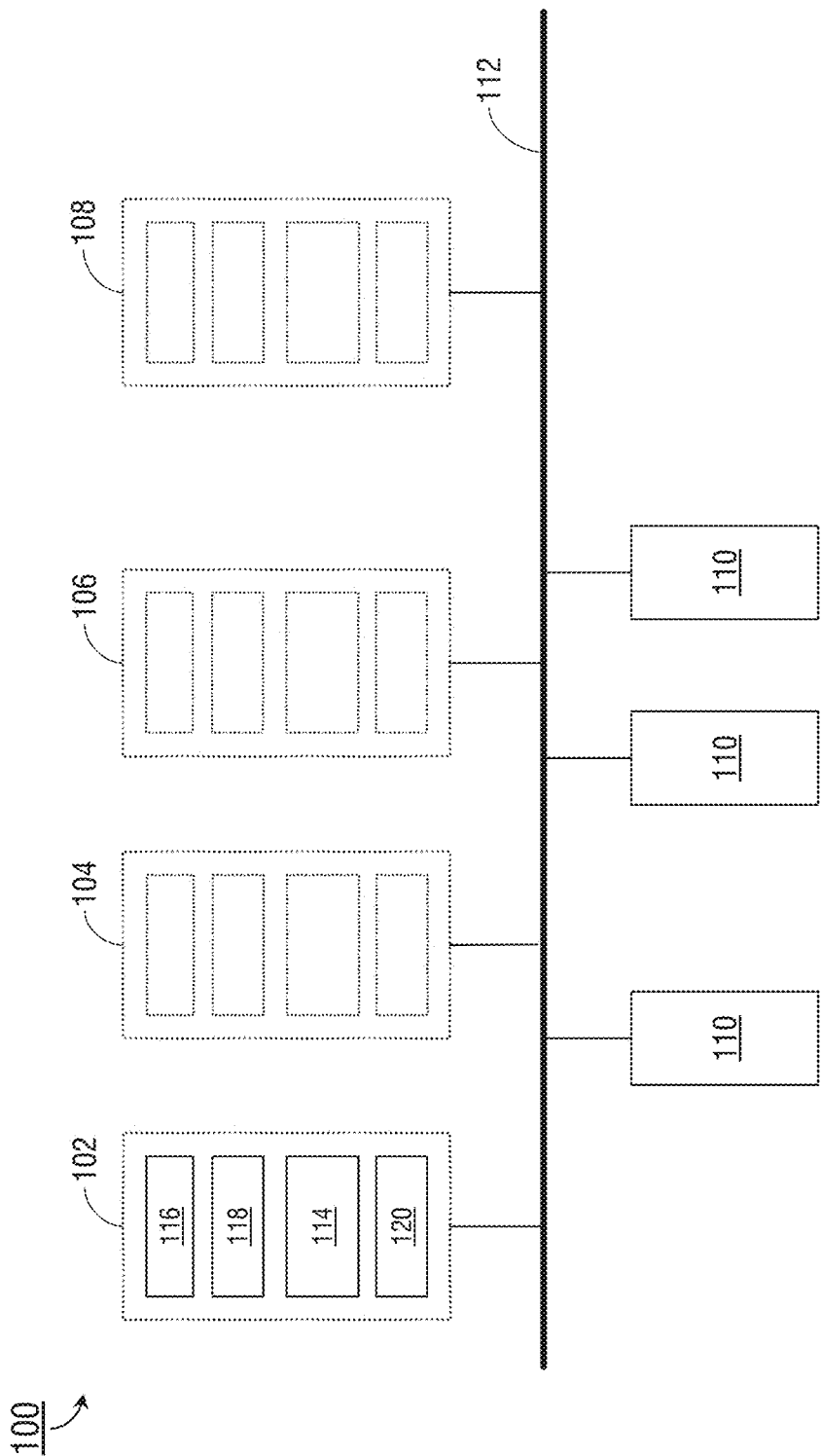
FIG. 1 is a diagrammatic illustration of an exemplary embodiment of a multicore processing environment (MCPE) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein, any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a multicore processing environment (MCPE) providing for realistic, targeted rate limiting of the ability of particular cores, or of particular applications executing thereon, to access shared system resources to the exclusion of other cores or applications. U.S. Pat. No. 8,943,287, which is herein incorporated in its entirety, discloses methods for limiting core access to DDR memory. Embodiments of the inventive concepts disclosed herein may provide comprehensive rate limiting of all applications executing within the MCPE to other types of shared resources. One approach to rate limiting may be to impose rate limiting based on worst-case scenarios, e.g., the worst-case execution time (WCET) of an application accessing a shared resource for which other cores or applications are competing at maximum capacity. However, WCET-based rate limiting may be overly conservative and over-restrictive of a particular application (and thus adversely affecting the efficiency of the system as a whole) based on a worst-case scenario that may rarely if ever occur. Accordingly, embodiments of the inventive concepts disclosed herein may provide a more realistic basis for limiting access to shared resources while ensuring that access to shared resources generally exceeds nominal use rates wherein user applications can meet their allocated execution deadlines.

Referring to FIG. 1, an exemplary embodiment of a multicore processing environment 100 (MCPE) according to the inventive concepts disclosed herein may include processing cores 102, 104, 106, 108 and shared resources 110 (shared system resources (SSR)) interconnected by a common access bus 112. The MCPE 100 may be an aircraft-based avionics processing system or similar vehicle-based system, or a ground-based control system. Shared resources 110 may include, but are not limited to, system memory (e.g., double data rate (DDR) synchronous dynamic random access memory (SDRAM), flash memory, non-volatile memory, or types of read-only memory (ROM)); shared caches (e.g., L1, L2, and L3 caches, translation lookaside buffer caches, or platform input/output caches); peripheral devices (e.g., display devices, key panel devices, or communication devices); and controllers (e.g., I/O controllers, direct memory access controllers, or programmable interrupt controllers). Any user application (114) executing on a processing core 102-108 may access a shared resource 110 via the common access bus 112. Each processing core 102-108 may include a core execution unit (116) on which the user applications 114 may be configured to execute as well as a core cache (118; e.g., L1 cache) and a core rate limiter 120. Each core rate limiter 120 may comprise hardware, software, or a combination of the two.

The MCPE 100 may track or monitor the usage of shared resources 110 such that the core rate limiters 120 may impose a configured maximal shared resource access rate on the access to any given shared resource 110 by a processing core 102-108 or any user application 114 configured for execution thereon. Each core rate limiter 120 may be configured to a defined traffic constraint envelope having a burst and rate component. For example, with respect to the processing core 102, the core rate limiters 120 may utilize token-bucket algorithms incorporating both run-time variables and static parameters. Each core rate limiter 120 determines a memory access envelope eligibility time (ET) based on prior shared resource access events occurring prior to the current access attempt. Access to the shared resource 110 may be allowed if it is determined that the current time is greater than the ET. There may be a wait until the ET is reached if it is determined that the current time is less than or equal to the ET. The other processing cores 104-108 may incorporate similar performance monitors. From another perspective, the rate limiter 120 may allow access to a shared resource 110 from a user application 114, provided the user application has not exceeded its configured maximum number of accesses during a configured duration of time.

Run-time variables may include, but are not limited to, the following examples. A running countdown counter (Crunning), directly monitored by one or more performance monitor registers of the processing core 102, may track access attempts to a particular shared resource 110 by the processing core 102 or by any user application 114 executing thereon. Should the counter value reach zero, a performance monitor exception may result. Token-bucket items (lastT) and (lastBucket) may record, respectively, the last time the token bucket of the processing core 102 was updated and the number of tokens currently in the token bucket at the time (lastT).

Static parameters may include, but are not limited to, the following examples. Token-bucket items (maxBucket) and (rate) may track, respectively, the allocated volume of the token bucket of the processing core 102 and the rate at which shared resource access attempts (e.g., tokens) accumulate. The value (Ctrip) may track the quantity of shared resource access attempts needed to invoke a Shared Resource Access Limit exception. Note that these static parameters are static during a given eligibility time window, but may vary between time windows.

As a first example, if the allocated volume (maxBucket) of the token bucket of the processing core 102 is greater than the value (Ctrip) at the time of a Shared Resource Access Limit exception, then sufficient time has elapsed so that the accumulated transmission (rate) allowed by the token bucket exceeds (Ctrip), and thus the core rate limiter 120 may allow the processing core 102 (or user applications 114 running thereon) to immediately resume usage of the shared resource 110.

As a second example, if (maxBucket) is less than (Ctrip) at the time of the Shared Resource Access Limit exception, the accumulated transmission (rate) allowed by the token bucket is less than (Ctrip) and thus the processing core 102 or its user applications 114 may be temporarily blocked from access to the shared resource 110 until the token bucket accumulates sufficient tokens to allow (Ctrip) quantity of shared resource accesses. When the shared resource 110 is accessed as a side effect of executing the user application 114, this may require halting the processing core 102 or the user application.

By way of a non-limiting example, initialization (at each application activation) of the shared resource limiting algorithm (e.g., the Shared Resource Access Rate (SRAR) Safety Net) may proceed as follows:
Crunning=Ctrip
lastT=0
lastBucket=maxBucket
and a shared resource access exception event (e.g., where Crunning has counted down to zero) may be characterized as follows:

$$dt = \text{now} - lastT$$

$$dtXr = dt * r$$

$$lastT = \text{now}$$

$$ResumeTime = \text{now} + \frac{Ctrip - (lastBucket + dtXr)}{r}$$

$$lastBucket = \text{MIN}(maxBucket, lastBucket + dtXr)$$

-continued

```
Crunning = Ctrip
if (ResumeTime ≥ now)loop
    lastBucket = 0
    while (ResumeTime > now) loop
        for (i = 0; i < 10000; i++)(or delay until ResumeTime)
    endwhile
endif
```

Finally, the upper bound on maximal shared resource access by any processor core 102-108 or peripheral of the MCPE 100 during any time interval [0,T] may be determined as MAX(Ctrip, b+r*t)

where b=burst amount, r=rate, and t=time.

Figure 2:
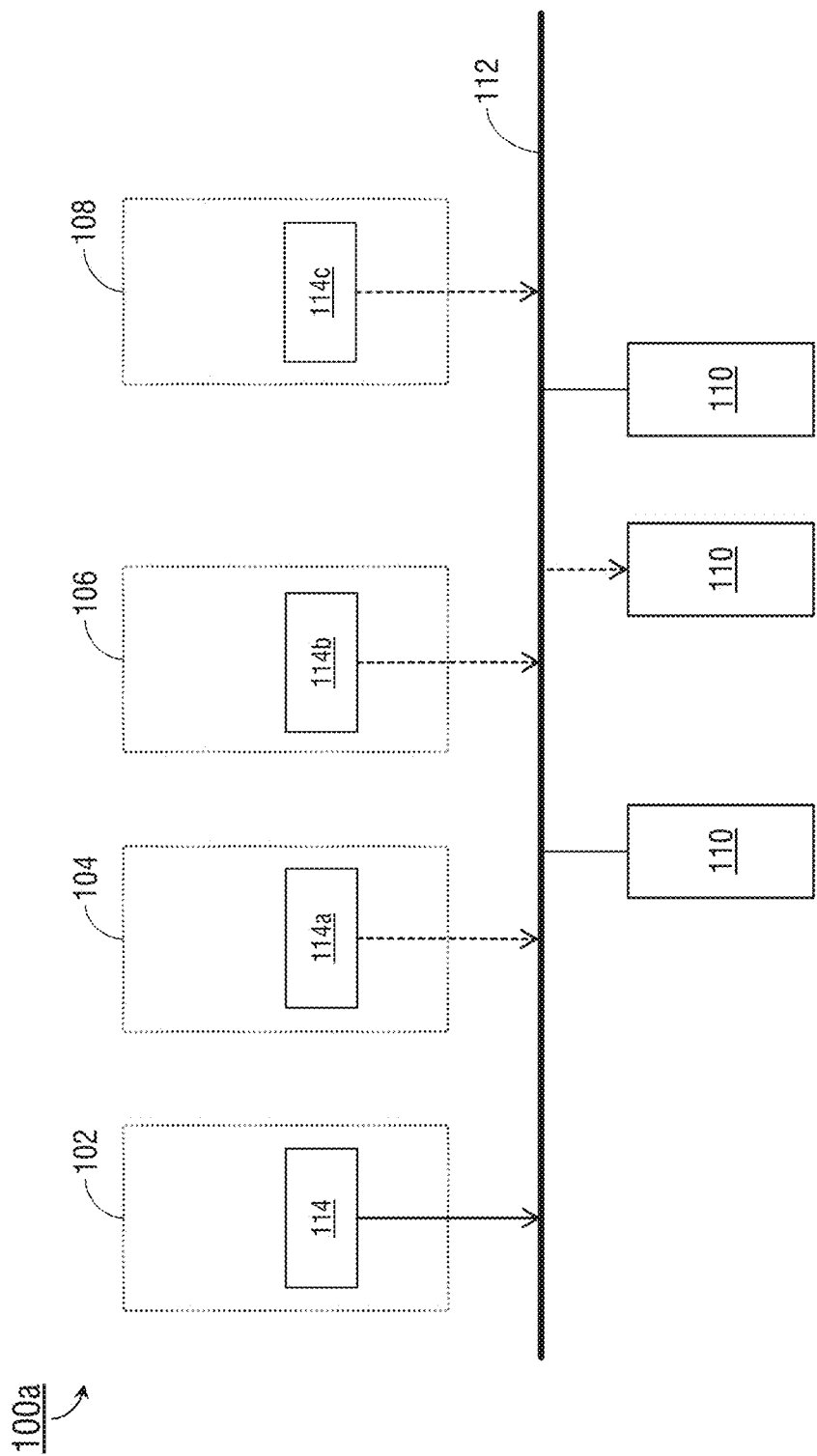
FIG. 2 is a diagrammatic illustration of the MCPE of FIG. 1.

Referring now to FIG. 2, the MCPE 100a may be implemented and may function similarly to the MCPE 100 of FIG. 1, except that the MCPE 100a may determine via multicore interference channel analysis how much additional execution time to allocate to the user application 114 running on the processing core 102 due to multicore interference. For example, the user application 114 may contend for use of the shared resource 110 with supporting applications 114a-c running respectively on processing cores 104, 106, and 108 (or with other applications running on the processing core 102), resulting in interference by the supporting applications 114a-c which in turn may increase the access time for the shared resource 110 (e.g., the amount of time the user application 114 waits for a connection to the shared resource 110 via the common access bus 112). In a worst case scenario (e.g., maximum multicore interference), the worst-case execution time (WCET) must be accounted for in order that the user application 114 (and any other user applications running within the MCPE 100) meets its deadlines for successful execution.

The MCPE 100a may use the SRAR safety net architecture described above with respect to FIG. 1 to predict and bound the increase in WCET for all user applications 114 running within the MCPE 100a in the presence of multicore interference and thus limit the total multicore interference within the MCPE. In this way, the degradation in shared resource access time may be reduced; the reduction in shared resource access time may be quantified and used by the MCPE 100a to predict a multicore application derating.

By way of a non-limiting example, for any user application 114 executing on a processing core 102-108 of the MCPE 100a, the delta shared resource access time (SRAT), or the amount of additional time needed by the user application 114 running on processing core 102 to access the shared resource 110 in the presence of multicore interference (e.g., from supporting applications 114a-c running on processing cores 104-108), may be characterized as Δsr. By determining the shared resource access time Δsr needed for each user application 114 to access each associated shared resource 110, the MCPE 100a may determine the additional time ΔAT for the user application 114 to execute due to multicore interference. For example, for each user application 114 that needs additional time ΔAT to execute due to multicore interference with a shared resource 110, and given n shared resources (110) $sr_0, sr_1, \ldots sr_n$ accessed by the user application 114, the total multicore application derating ΔAT may be characterized as:

$$\Delta AT = \sum_{k=0}^{n} (\Delta sr_k)(sr_k \text{ access count})$$

where the shared resource access count for each shared resource $sn_k$ may be determined as described in U.S. Pat. No. 9,965,326, which is herein incorporated by reference in its entirety.

For each shared resource 110 of the MCPE 100a, the shared resource 110 potentially concurrently accessed by user applications 114, 114a-c, a SRAR safety net may be configured based on the integration of the MCPE 100a. The MCPE 100a may then use this configuration to determine the shared resource access time Δsr for each shared resource accessed by the user application 114. The Δsr for each shared resource $sn_k$ may then be fed into the above summation to determine ΔAT for each hosted user application 114.

For any user application 114 within the MCPE 100a, access to any shared resource 110 may be modelled as a queue, e.g., shared resource access time may be represented by waiting time as the user application 114 waits to access the shared resource 110 via the common access bus 112. In the presence of multicore interference, as other applications 114a-c and other processing cores 104-108 share the common access bus 112 to access the shared resource 110, this waiting time may increase.

Figure 3A:
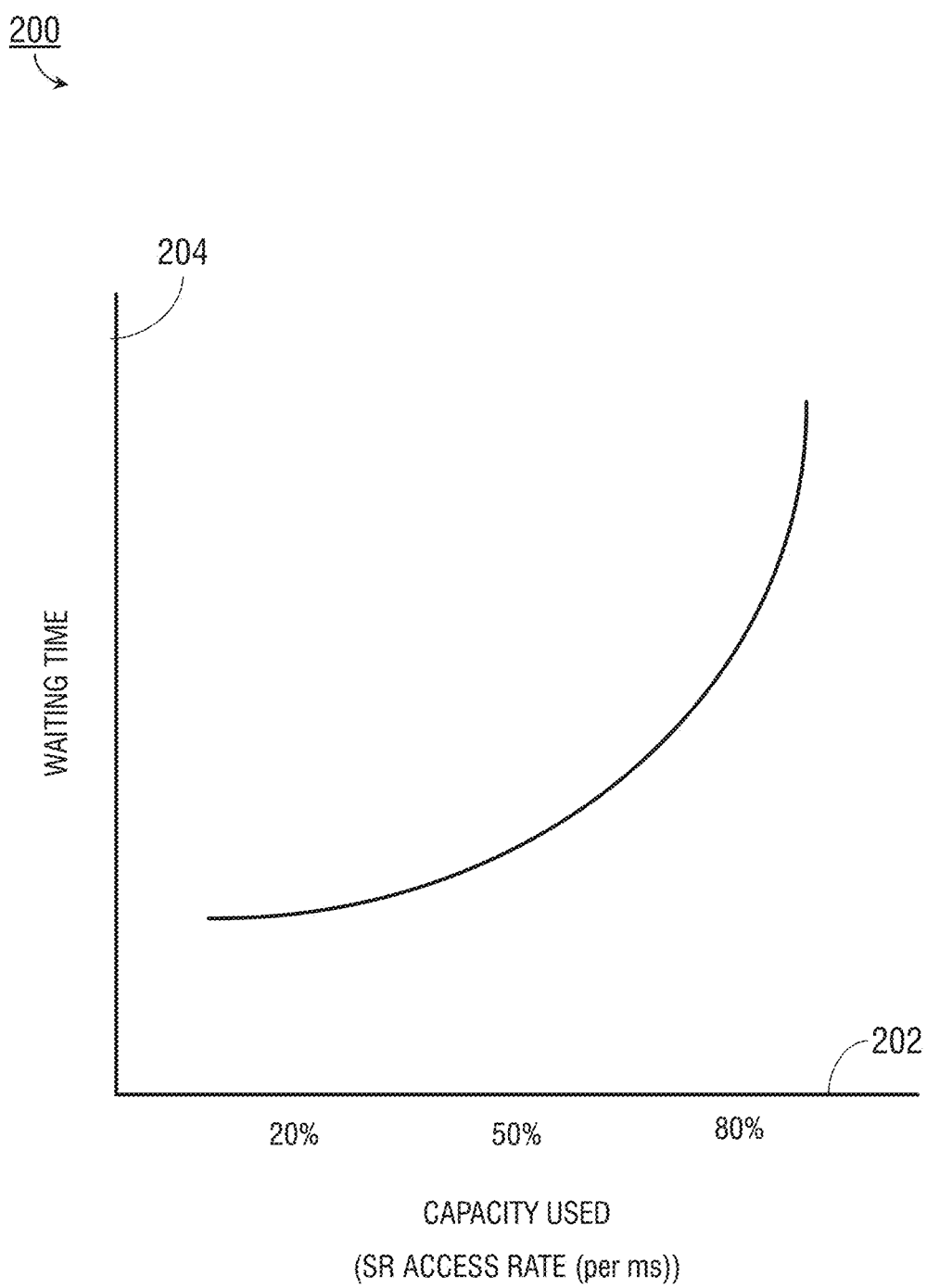
FIGS. 3A through 3D illustrate relationships between shared resource access rates and shared resource access times within the MCPE of FIG. 1.

Referring now to FIG. 3A, within the MCPE 100a (FIG. 2) there exists a relationship (200) between the capacity utilization (202) of the common access bus (112, FIG. 2) to access a shared resource (110, FIG. 2) and the waiting time (204) to access the shared resource (e.g., in the common access bus queue). The MCPE 100a may incorporate the SRAR safety net to quantify and reduce shared resource access time Δsr for each shared resource 110 by restricting access by the user application 114 to the common bus capacity (202) used to access that shared resource.

First, a graph or other quantitative representation of the relationship 200, as shown by FIG. 3, may be determined by test measurements within the MCPE 100a. For example, the waiting time to access the shared resource 110 by the user application (114, FIG. 2) executing on the processing core (102, FIG. 2) may be measured: first, without interference from other applications (e.g., running on the processing core 102 or on other processing cores 104-108), then as contending applications (114a-c, FIG. 2) running on the other processing cores 104-108 or on the same processing core (102) contend for the same shared resource 110 at varying degrees of capacity. The shared resource access time Δsr (204) for the shared resource 110 may thus be determined as a function of common access bus capacity (202). Common access bus capacity (202) may further be expressed as an absolute shared resource access rate, e.g., shared resource accesses per millisecond.

Figure 3B:
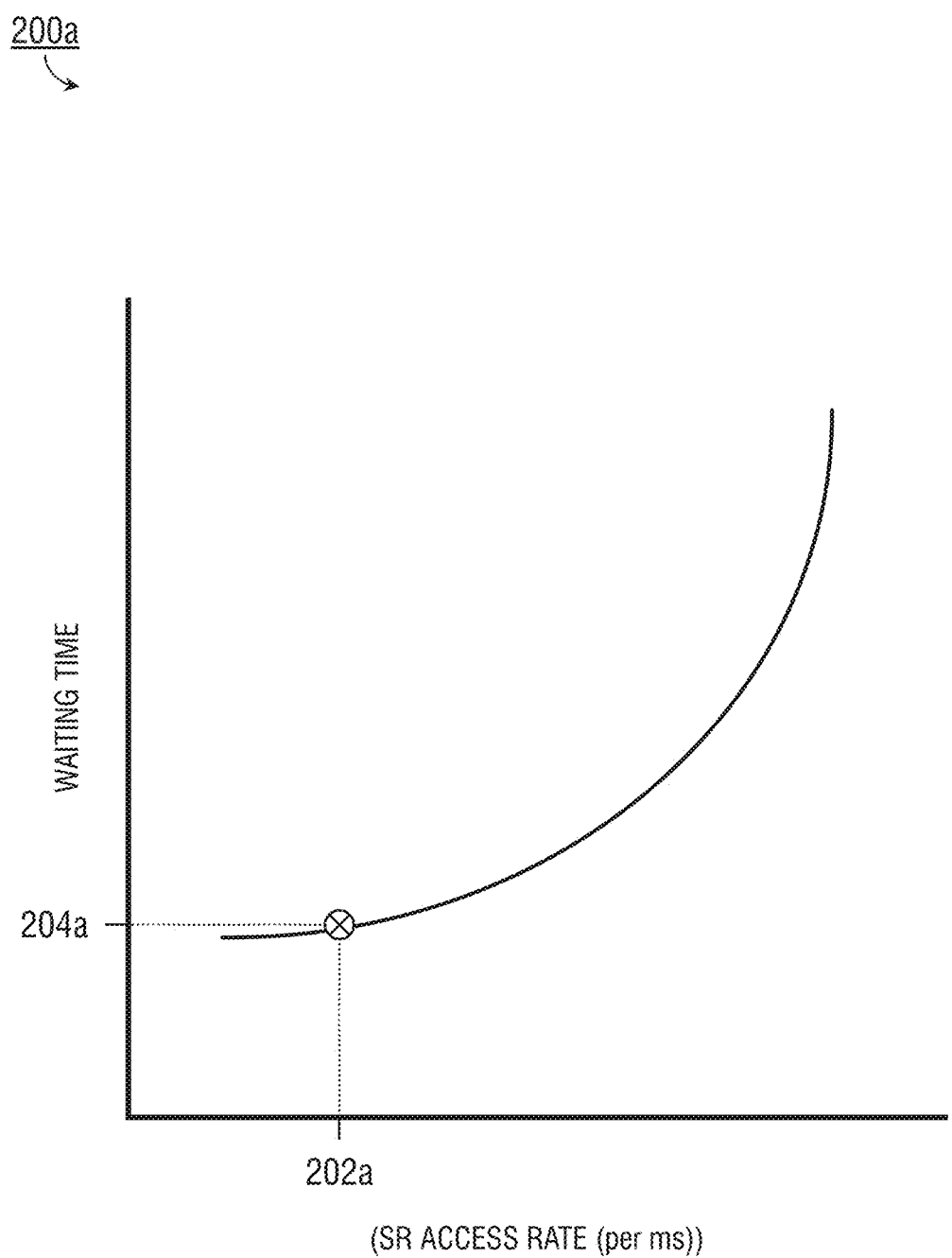

Referring to FIG. 3B, the relationship 200a may be implemented and may operate similarly to the relationship 200 of FIG. 3A, except that the relationship 200a may further show a baseline shared resource access rate 202a and a corresponding baseline shared resource access time 204a for the user application (114, FIG. 2) running on the processor core 102 (FIG. 2) to access the shared resource (110, FIG. 2). For example, the MCPE (100a, FIG. 2) may measure a baseline shared resource access time 204a (for the user application 114, running on the processor core 102) to access the shared resource 110 (e.g., via carrying out a representative sample of burst and strides) without competing access to the common access bus (112, FIG. 2) or to the shared resource 110 by other contending applications (114a-c, FIG. 2) running on other processing cores (104-108, FIG. 2). In this way, the MCPE 100a may determine the baseline shared resource access rate (202a) corresponding to the baseline shared resource access time 204a.

Figure 3C:
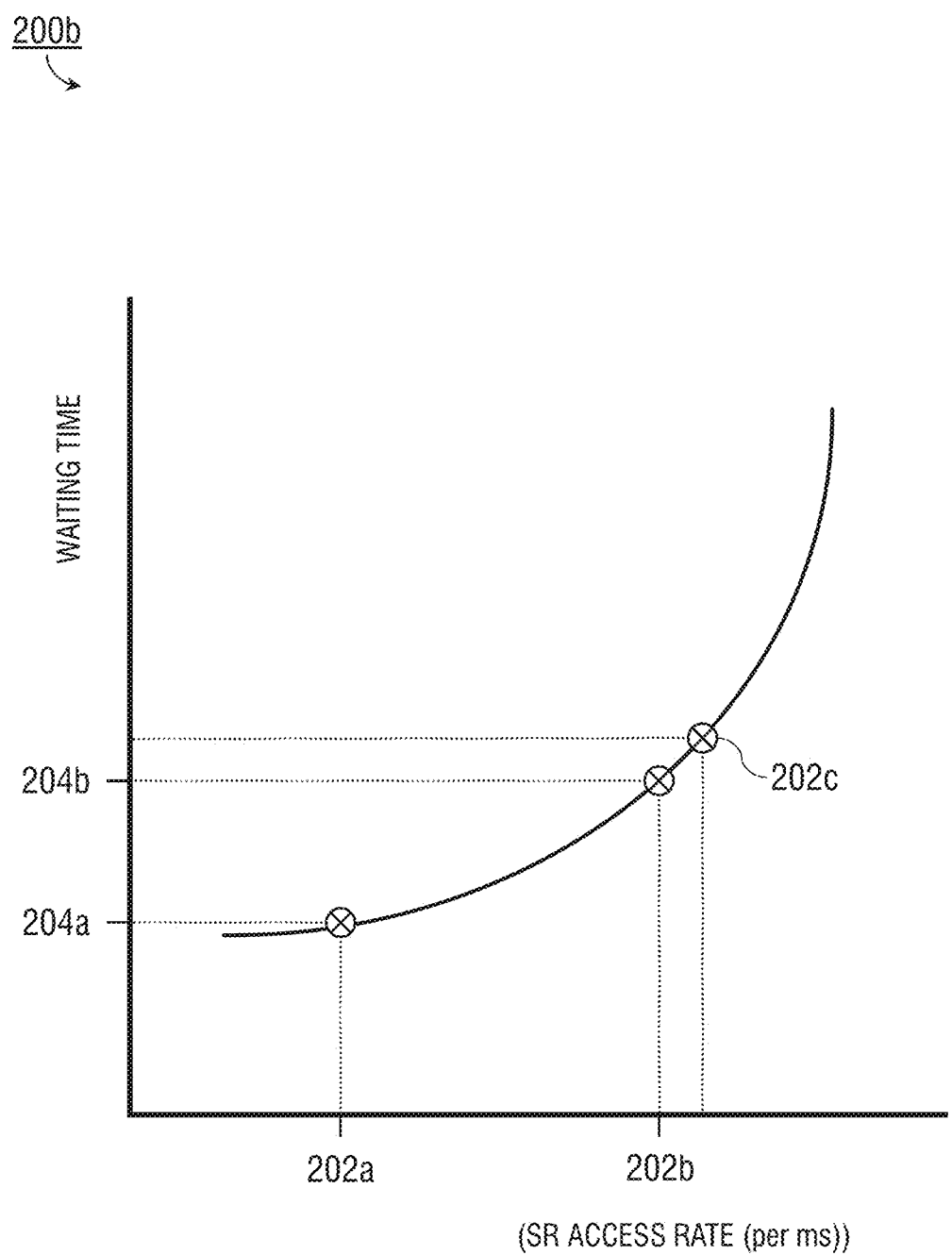
Figure 3D:
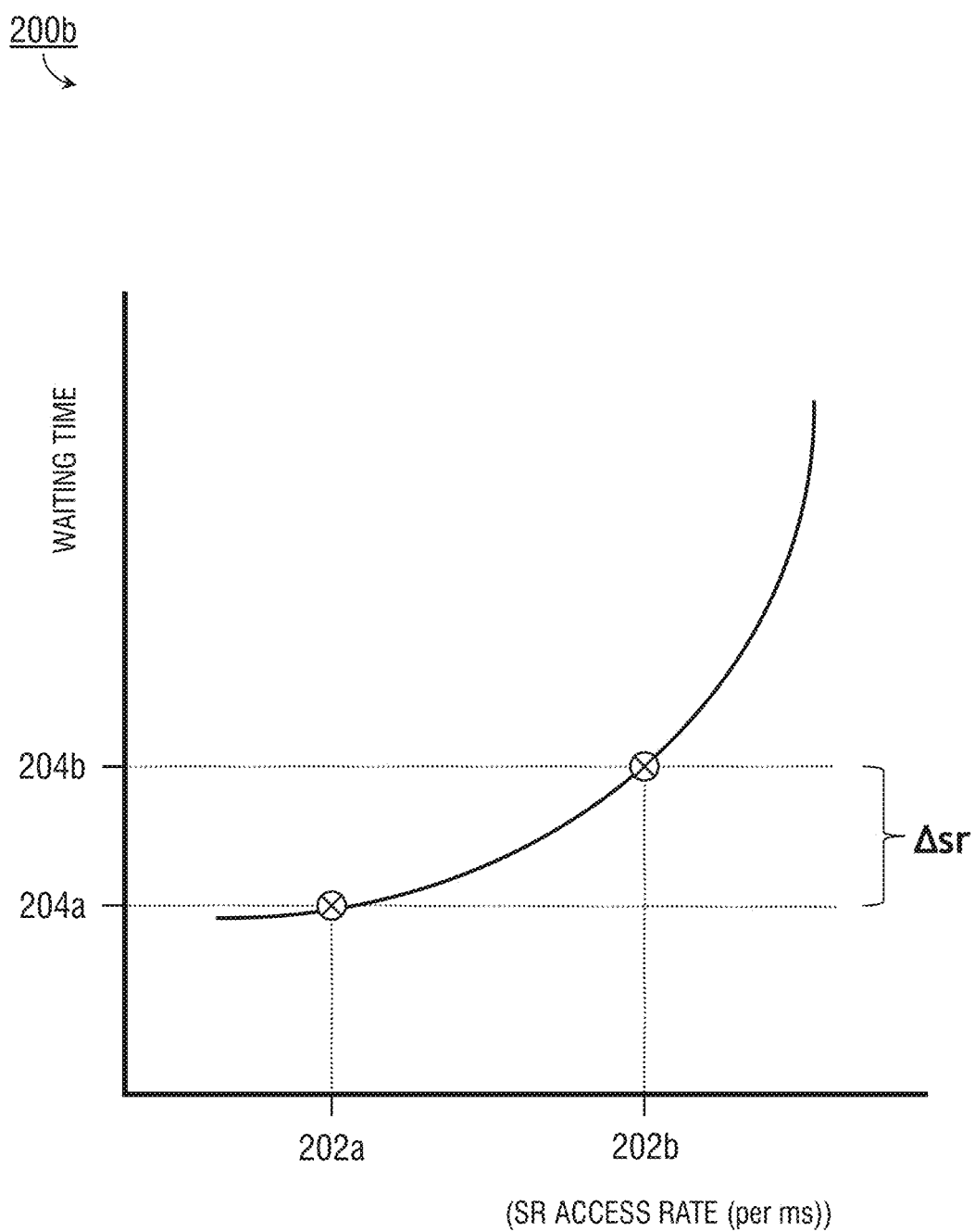

Referring to FIGS. 3C and 3D, the relationship 200b may be implemented and may operate similarly to the relationship 200a of FIG. 3B, except that the relationship 200b may further show the shared resource utilization of concurrently executing system applications (e.g., user application 114 and supporting applications 114a-c, FIG. 2) as recorded by the MCPE (100a, FIG. 2) and based on the shared resource utilization of each user application 114. For example, the integrator (or software developer) of the MCPE 100a may investigate the source code of the user application 114 to determine a worst-case execution time (WCET) scenario that maximizes usage of the shared resource (110, FIG. 2) by the user application 114. The worst-case contention shared resource access time (204b) may correspond to a worst-case capacity and shared resource access rate (202b). In some embodiments, the worst-case capacity 202b may include an additional safety margin (202c) above and beyond the worst-case contention shared resource access time (204b) to account for inflight variations in shared resource accesses, or to allow common configuration of user applications 114 by selecting an upper bound based on actual shared resource access rates. Based on the determined capacity utilization, the MCPE 100a may calculate the difference between the contention shared resource access time 204b and the baseline shared resource access time (204a) to determine Δsr for each set of potentially concurrently executing applications (114a-c). By determining Δsr for each set of potentially concurrently executing applications 114a-c, the MCPE 100a may be used to determine the total Δsr for the associated user application 114 and each shared resource 110 accessed by the user application. The maximal capacity utilization from all potentially concurrently executing applications 114a-c may be used, or alternatively if scheduler ticks j are synchronized between the processing cores 102-108, a distinct $\Delta sr_j$ may be computed based on the maximal capacity utilization from all potentially concurrently executing applications for each scheduler tick j.

Once the integrator of the MCPE 100a has determined the total Δsr for each shared resource 110 accessed by a user application 114, the multicore derating ΔAT for each user application 114 running within the MCPE 100a may be determined, e.g., $$\Delta AT = \sum_{k=0}^{n} (\Delta sr_k)(sr_k \text{ access count})$$

or, where a distinct $\Delta sr_j$ is independently determined for each scheduler tick j, the multicore derating $\Delta AT_j$ for each individual scheduler tick may be determined.

It should be noted that the above equation may determine the multicore derating ΔAT for each activation of the user application 114. The integrator of the MCPE 100a may analyze multiple determinations of this multicore derating ΔAT in order to determine an appropriate adjustment time to the baseline activation time of each user application 114. (Alternatively, the integrator of the MCPE 100a may allocate to each user application 114 an activation time incorporating the determined adjustment time in addition to the baseline activation time.) The integrator of the MCPE 100a may determine an adjustment time lower than the contention shared resource access time 204b corresponding to the worst-case capacity and shared resource access rate (202b), but sufficient to ensure that the probability of the user application 114 completing its workload for a given activation (given the allocated/adjusted time) meets a predetermined goal. Similarly, the core rate limiters 120 on each processing core 102-108 may constrain access to shared resources 110 by each user application 114 executing on a given processor core based on the adjusted or allocated execution time of all user applications executing on the particular processing core.

Some systems may employ an operating system or hypervisor to coordinate and synchronize application execution schedules between processing cores 102-108. This coordination can be leveraged to identify unique shared resource usage data based on the set of competing applications (e.g., 114a-c, FIG. 2) configured to concurrently execute in the same period as the user application 114. OS scheduler ticks may delineate the synchronized periods. The configuration of the core rate limiters 120 and the delta SRAT may vary per set of concurrently executing applications as the set of applications change throughout the execution sequence. The variance in rate limiting and SRAT is based on the resource access needs of the various user applications 114, 114a-c as these needs vary over time. Therefore, the techniques of the SRAR safety net can be applied to each set of scheduler ticks, such that an independent delta SRAT and associated derating ΔAT can be determined for each synchronized period. This approach optimizes the SRAR safety net to avoid creating overly conservative software execution schedules, which in-turn provides a higher level of usable processing capacity for the system.

Referring to FIG. 4, the MCPE 100b may be implemented and may function similarly to the MCPE 100a of FIG. 2, except that the MCPE 100b may include one or more master controller systems (122) capable of accessing shared resources 110 via the common access bus 112. The master controller system 122 may include a master controller 124 (e.g., I/O controller, direct memory access (DMA) or other like memory controller) and a master controller rate limiter 126. Similarly to the core rate limiters 120, the master controller rate limiters 126 may constrain access to shared resources 110 by the processing cores 102-108 or master controller 124 such that shared resource access is limited to an expected value.

Figure 5:
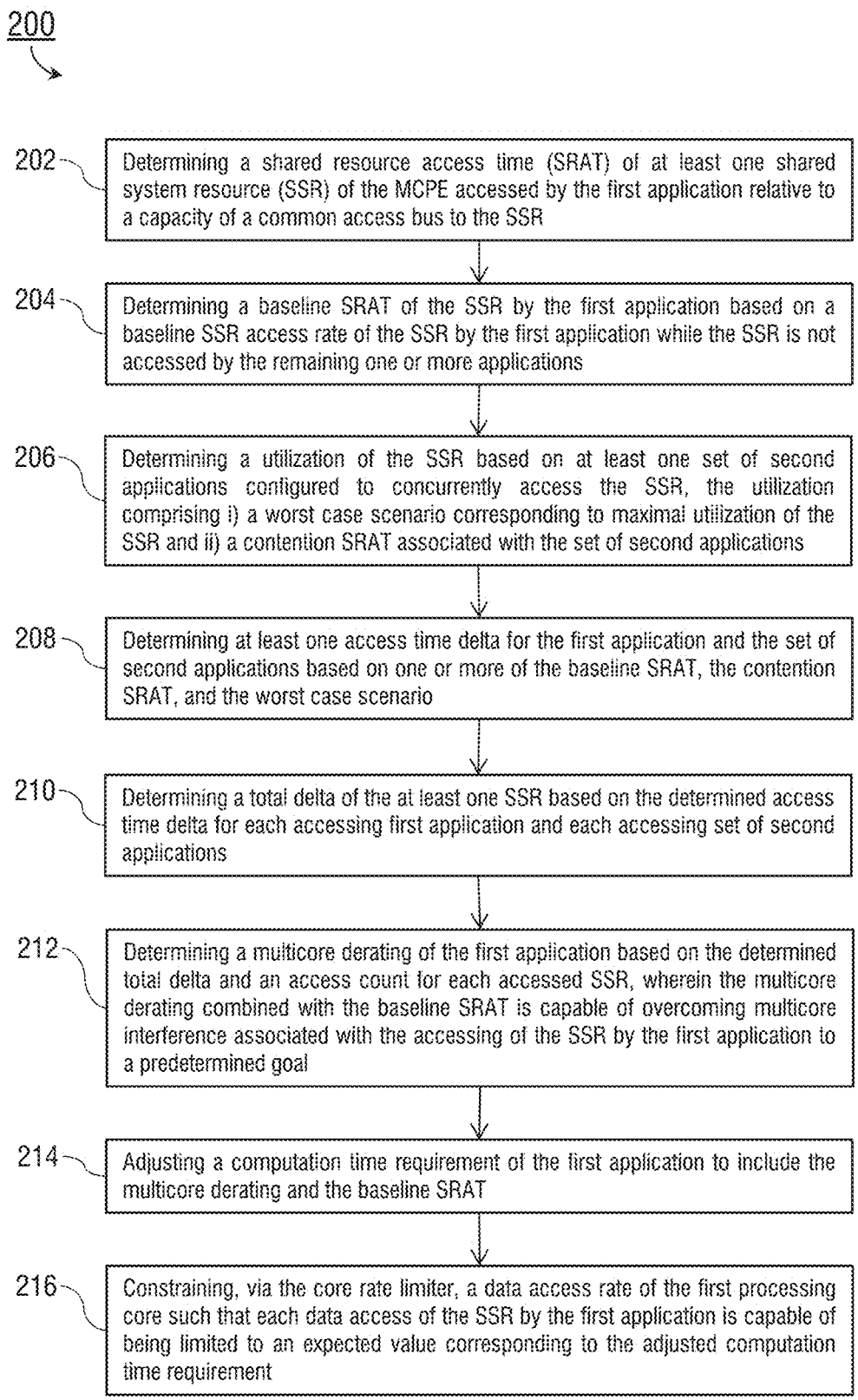
FIG. 5 is a process flow diagram of an exemplary embodiment of a method for limiting shared resource access in the MCPE according to the inventive concepts disclosed herein.

Referring to FIG. 5, an exemplary embodiment of a method 200 for limiting access to shared system resources (SSR) by each user application executing on the MCPE according to the inventive concepts disclosed herein may be implemented by the system 100 in some embodiments, and may include one or more of the following steps.

At a step 202, the MCPE (or its integrator) determines (e.g., for each user application executing on the MCPE) a shared resource access time (SRAT) of each SSR accessed by that user application, relative to the capacity of a common access bus (e.g., to handle access requests) to the SSR or to the innate bandwidth of the SSR.

At a step 204, the MCPE determines a baseline SSR access rate of the SSR by the user application while the other applications running on the MCPE are not accessing the SSR, thereby determining a baseline SRAT of the SSR by the user application.

At a step 206, the MCPE determines a utilization of the SSR based on a set of all the user applications configured to concurrently access the SSR (e.g., concurrent with the user application currently under test); the utilization may include at least a worst-case scenario corresponding to maximal utilization of the SSR and a contention SRAT for the concurrently executing applications.

At a step 208, the MCPE determines an access time delta (e.g., a delta over the baseline SRAT) for the user application under test and all concurrently executing user applications based on the baseline SRAT, the contention SRAT, and the worst-case scenario.

At a step 210, the MCPE determines a total delta for each SSR accessed by the user application under test, based on the determined access time delta for each accessing user application and concurrently accessing user applications.

At a step 212, the MCPE determines a multicore derating of the user application based on (for each SSR accessed by that user application) the total delta as well as an access count; the multicore derating, when combined with the baseline SRAT, should provide sufficient time to overcome multicore interference associated with SSR access to a defined goal (e.g., while providing for less time than for a worst-case scenario where maximal utilization may be assumed but overcoming interference assured).

At a step 214, the MCPE adjusts the computation time requirement for the user application under test based on the determined multicore derating and baseline SRAT. Alternatively, the MCPE may allocate to each user application a computation time requirement based on the multicore derating and baseline SRAT.

At a step 216, the core rate limiter of the processing core on which the user application is executing constrains the data access rate of the processing core such that data access to the SSR by the user application may be limited to an expected value that corresponds to the adjusted or allocated computation time requirement.

As will be appreciated from the above, systems and methods according to embodiments of the inventive concepts disclosed herein may limit the ability of particular processing cores within the MCPE, or of particular applications executing thereon, to shared system resources to the exclusion of other cores and applications. However, the inventive concepts disclosed herein may provide for more efficient rate limiting based on more realistic performance assessments of application execution time than adjustments or allocations to execution time based on worst-case execution scenarios, while still allowing user applications to complete their workloads within their allotted times.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A multicore processing environment (MCPE), comprising:
   a plurality of processing cores, each processing core including a core rate limiter and associated with one or more applications configured to execute thereon;
   a plurality of shared system resources (SSR), each SSR associated with at least one accessing application of the one or more applications;
   and
   at least one common access bus configured to interconnect the plurality of processing cores and the plurality of shared resources;
   the MCPE configured to, for each first application of the one or more applications, the first application configured to 1) access at least one first SSR of the plurality of SSR and 2) execute on a first processing core of the plurality of processing cores:
   a) determine a shared resource access time (SRAT) of the first SSR by the first application relative to the capacity of the at least one common access bus to the first SSR;
   b) determine a baseline SSR access rate of the first SSR by the first application while the first SSR is not accessed by the one or more applications, the baseline SSR access rate corresponding to a baseline SRAT;
   c) determine a utilization of the first SSR based on the associated accessing applications, the utilization including at least i) a worst case scenario corresponding to maximal utilization of the first SSR and ii) a contention SRAT associated with one or more second applications of the one or more applications, the one or more second applications capable of concurrently accessing the first SSR;
   d) determine an access time delta for at least one of the first application and the one or more second applications based on one or more of the baseline SRAT, the worst case scenario, and the contention SRAT;
   e) determine a total delta of each first SSR based on the determined access time delta for each associated first application and the one or more second applications;
   f) determine a multicore derating of the first application based on the determined total delta and an access count for each associated first SSR, wherein the multicore derating plus the baseline SRAT is capable of overcoming multicore interference associated with the access by the first application of the first SSR to a predetermined goal;
   and
   g) adjust a computation time requirement of the first application to include the multicore derating and the baseline SRAT;
   and
   each core rate limiter configured to constrain a data access rate of the first processing core such that each data access of the first application to the first SSR is capable of being limited to an expected value corresponding to the adjusted computation time requirement.

2. The MCPE of claim 1, wherein the plurality of SSR includes one or more of a shared cache, a shared peripheral device, and a shared controller.

3. The MCPE of claim 1, wherein each core rate limiter is configured to a defined traffic envelope including at least a burst and rate component.

4. The MCPE of claim 1, wherein the MCPE is configured to:

determine the baseline SSR access rate of the first SSR via at least one first execution of the first application by the first processing core while the other processing cores are idle; and determine the contention SRAT of the first SSR by the first application via at least one second execution of the first application by the first processing core while executing the one or more second applications via the other processing cores.

5. The MCPE of claim 4, wherein the at least one first execution of the first application includes a representative sample of burst and strides.

6. The MCPE of claim 4, wherein the MCPE is configured to determine the multicore derating of the first application by:
calculate a change in activation time for each second execution of the first application;
generate statistical data based on the at least one change in activation time; and
determine the multicore duration based on the statistical data.

7. The MCPE of claim 1, wherein each core rate limiter is configured to execute a token-bucket process comprising:
waiting until an access count of the first SSR by the first application is reached, wherein at least one event counter of the core rate limiter is set to a predetermined value;
determine an access envelope eligibility time (ET) of the first SSR when the access count is reached; and
waiting until the ET is reached.

8. The MCPE of claim 1, wherein the MCPE is configured to determine the multicore derating corresponding to at least one scheduler tick associated with a synchronized execution of the first application and the associated one or more second applications.

9. The MCPE of claim 1, further comprising:
at least one master controller system connected to the at least one common access bus and capable of accessing the plurality of SSR thereby, the master controller system comprising a master controller and a master controller rate limiter,
each core rate limiter and master controller rate limiter configured to constrain the data access rate of one or more of the first processing core and the master controller such that each data access of the one or more of the first processing core and the master controller to the first SSR is capable of being limited to an expected value corresponding to the adjusted computation time requirement.

10. A multicore processing environment (MCPE), comprising:
a plurality of processing cores, each processing core including a core rate limiter and associated with one or more applications configured to execute thereon;
a plurality of shared system resources (SSR), each SSR associated with at least one accessing application of the one or more applications; and
at least one common access bus configured to interconnect the plurality of processing cores and the plurality of shared resources;
the MCPE configured to, for each first application of the one or more applications, the first application configured to 1) access at least one first SSR of the plurality of SSR and 2) execute on a first processing core of the plurality of processing cores:

a) determine a shared resource access time (SRAT) of the first SSR by the first application relative to the capacity of the at least one common access bus to the first SSR;
b) determine a baseline SSR access rate of the first SSR by the first application while the first SSR is not accessed by the one or more applications, the baseline SSR access rate corresponding to a baseline SRAT;
c) determine a utilization of the first SSR based on the associated accessing applications, the utilization including at least i) a worst case scenario corresponding to maximal utilization of the first SSR and ii) a contention SRAT associated with one or more second applications of the one or more applications, the one or more second applications capable of concurrently accessing the first SSR;
d) determine an access time delta for at least one of the first application and the one or more second applications based on one or more of the baseline SRAT, the worst case scenario, and the contention SRAT;
e) determine a total delta of each first SSR based on the determined access time delta for each associated first application and one or more second applications;
f) determine a multicore derating of the first application based on the determined total delta and an access count for each associated first SSR, wherein the multicore derating plus the baseline SRAT is capable of overcoming multicore interference associated with the access by the first application of the first SSR to a predetermined goal; and
g) allocate a computation time requirement of the first application based on the multicore derating and the baseline SRAT; and
each core rate limiter configured to constrain a data access rate of the first processing core such that each data access of the first application to the first SSR is capable of being limited to an expected value corresponding to the allocated computation time requirement.

11. The MCPE of claim 10, wherein the plurality of SSR includes one or more of a shared cache, a shared peripheral device, and a shared controller.

12. The MCPE of claim 10, wherein each core rate limiter is configured to a defined traffic envelope including at least a burst and rate component.

13. The MCPE of claim 10, wherein the MCPE is configured to:
determine the baseline SSR access rate of the first SSR via at least one first execution of the first application by the first processing core while the other processing cores are idle; and
determine the contention SRAT of the first SSR by the first application via at least one second execution of the first application by the first processing core while executing the one or more second applications via the other processing cores.

14. The MCPE of claim 13, wherein the at least one first execution of the first application includes a representative sample of burst and strides.

15. The MCPE of claim 13, wherein the MCPE is configured to determine the multicore derating of the first application by:
calculate a change in activation time for each second execution of the first application;
generate statistical data based on the at least one change in activation time; and
determine the multicore duration based on the statistical data.

16. The MCPE of claim 10, wherein each core rate limiter is configured to execute a token-bucket process comprising:
waiting until an access count of the first SSR by the first application is reached, wherein at least one event counter of the core rate limiter is set to a predetermined value;
determine an access envelope eligibility time (ET) of the first SSR when the access count is reached; and
waiting until the ET is reached.

17. The MCPE of claim 10, wherein the MCPE is configured to determine the multicore derating corresponding to at least one scheduler tick associated with a synchronized execution of the first application and the associated one or more second applications.

18. The MCPE of claim 10, further comprising:
at least one master controller system connected to the at least one common access bus and capable of accessing the plurality of SSR thereby, the master controller system comprising a master controller and a master controller rate limiter,
each core rate limiter and master controller rate limiter configured to constrain the data access rate of one or more of the first processing core and the master controller such that each data access of the one or more of the first processing core and the master controller to the first SSR is capable of being limited to an expected value corresponding to the adjusted computation time requirement.

19. A method for limiting shared resource access in a multicore processing environment (MCPE), the method comprising:
for at least one first application configured to execute on a first processing core of the MCPE, the processing core including a core rate limiter:
determining a shared resource access time (SRAT) of at least one shared system resource (SSR) of the MCPE accessed by the first application relative to a capacity of a common access bus to the SSR;
determining a baseline SRAT of the SSR by the first application based on a baseline SSR access rate of the SSR by the first application while the SSR is not accessed by the one or more applications of the MCPE;
determining a utilization of the SSR based on one or more second applications configured to concurrently access the SSR, the utilization comprising i) a worst case scenario corresponding to maximal utilization of the SSR and ii) a contention SRAT associated with the one or more second applications;
determining at least one access time delta for the first application and the one or more second applications based on one or more of the baseline SRAT, the contention SRAT, and the worst case scenario;
determining a total delta of the at least one SSR based on the determined access time delta for each accessing first application and associated one or more second applications;
determining a multicore derating of the first application based on the determined total delta and an access count for each accessed SSR, wherein the multicore derating combined with the baseline SRAT is capable of overcoming multicore interference associated with the accessing of the SSR by the first application to a predetermined goal;
adjusting a computation time requirement of the first application to include the multicore derating and the baseline SRAT; and
constraining, via the core rate limiter, a data access rate of the first processing core such that each data access of the SSR by the first application is capable of being limited to an expected value corresponding to the adjusted computation time requirement.

20. The method of claim 19, wherein adjusting a computation time requirement of the first application to include the multicore derating and the baseline SRAT includes:
allocating a computation time requirement of the first application based on the multicore derating and the baseline SRAT.

* * * * *